United States Patent
Morrison et al.

(10) Patent No.: US 12,555,409 B2
(45) Date of Patent: Feb. 17, 2026

(54) EXTRACTING INFORMATION ABOUT PEOPLE FROM SENSOR SIGNALS

(71) Applicant: Microsoft Technology Licensing, LLC, Redmond, WA (US)

(72) Inventors: Cecily Peregrine Borgatti Morrison, Cambridge (GB); Martin Philip Grayson, Bedford (GB); Anja Dunphy, Cambridge (GB); Edward Bryan Cutrell, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 281 days.

(21) Appl. No.: 17/759,462

(22) PCT Filed: Dec. 14, 2020

(86) PCT No.: PCT/US2020/064739
§ 371 (c)(1),
(2) Date: Jul. 26, 2022

(87) PCT Pub. No.: WO2021/154402
PCT Pub. Date: Aug. 5, 2021

(65) Prior Publication Data
US 2023/0046710 A1  Feb. 16, 2023

(30) Foreign Application Priority Data
Jan. 27, 2020 (EP) ..................................... 20153946

(51) Int. Cl.
*G06V 40/16* (2022.01)
*G06V 10/10* (2022.01)
(Continued)

(52) U.S. Cl.
CPC ............ *G06V 40/172* (2022.01); *G06V 10/17* (2022.01); *G06V 10/22* (2022.01); *G06V 20/20* (2022.01);
(Continued)

(58) Field of Classification Search
CPC ...... G06V 20/52; G06V 40/161; G06V 10/22; G06V 40/20; G06V 40/172; G06V 10/17; G06V 20/20; G06V 10/62
See application file for complete search history.

(56) References Cited

U.S. PATENT DOCUMENTS 10,134,048 B2   11/2018  Deephanphongs et al.
10,187,690 B1    1/2019  Garcia et al.
(Continued)

FOREIGN PATENT DOCUMENTS

CN          113396420 A  *  9/2021  ........... G06V 10/768

OTHER PUBLICATIONS

Communication pursuant to Article 94(3) Received in European Patent Application No. 20834103.2, mailed on Mar. 13, 2024, 5 pages.
"Extended European Search Report Issued in Application No. 20153946.7", Mailed Date: Jul. 17, 2020, 9 Pages.
(Continued)

*Primary Examiner* — Wednel Cadeau
(74) *Attorney, Agent, or Firm* — Barta Jones, PLLC

(57) ABSTRACT

There is provided a computer implemented method of extracting information about a person. Incoming sensor signals for monitoring people within a field of view of a sensor system are received and processed. In response to detecting a person located within a notification region, an output device outputs a notification to the detected person. Processing of the incoming sensor signals continues in order to monitor behaviour patterns of the person and determine from his behaviour patterns whether he is currently in a consenting or non-consenting state. An extraction function
(Continued)

attempts to extract information about the person irrespective of his determined state. A sharing function determines whether or not to share an extracted piece of information about the person with a receiving entity in accordance with his determined state, the information not being shared unless and until it is subsequently determined that the person is in the consenting state.

20 Claims, 9 Drawing Sheets

(51) Int. Cl.
  *G06V 10/22* (2022.01)
  *G06V 10/62* (2022.01)
  *G06V 20/20* (2022.01)
  *G06V 20/52* (2022.01)
  *G06V 40/20* (2022.01)

(52) U.S. Cl.
  CPC ............ *G06V 20/52* (2022.01); *G06V 40/161* (2022.01); *G06V 40/20* (2022.01); *G06V 10/62* (2022.01); *G06V 40/173* (2022.01)

(56) References Cited

U.S. PATENT DOCUMENTS

| | | |
|---|---|---|
| 10,404,924 B2 | 9/2019 | Breuer et al. |
| 2012/0119987 A1 | 5/2012 | Im et al. |
| 2012/0163679 A1 | 6/2012 | Gavita |
| 2014/0223460 A1 | 8/2014 | Hatambeiki et al. |
| 2016/0080642 A1* | 3/2016 | Jung ............... H04N 5/772 |
| | | 386/227 |
| 2018/0165437 A1 | 6/2018 | Shim et al. |
| 2019/0102606 A1 | 4/2019 | Nowozin et al. |
| 2019/0267786 A1* | 8/2019 | Zhao ................. G06T 7/73 |

OTHER PUBLICATIONS

Bell, Karissa, "Google's Nest Hub Max is an Echo Show Killer with Facial Recognition", Retrieved From: https://mashable.com/article/google-nest-hub-max, May 7, 2019, 11 Pages.

"International Search Report & Written Opinion issued in PCT Application No. PCT/US20/064739", Mailed Date: Apr. 16, 2021, 13 Pages.

Communication under Rule 71(3) Received for European Application No. 20834103.2, mailed on Sep. 12, 2025, 42 pages.

Communication under Rule 71(3) Received for European Application No. 20834103.2, mailed on Dec. 12, 2025, 07 pages.

* cited by examiner

EXTRACTING INFORMATION ABOUT PEOPLE FROM SENSOR SIGNALS

TECHNICAL FIELD OF INVENTION

The present disclosure relates to information extraction about people from sensor signals, including, for example, facial recognition applied to video images.

BACKGROUND

Personally identifiable information can be extracted from image data through the use of recognition systems such as facial recognition systems. These systems compare distinguishing features such as facial features detected in the image data to faces stored in a database in order to identify the person captured in the image.

Facial recognition systems generally employ machine learning techniques to train a facial recognition model to both detect faces in an image and to identify such detected faces by analysing patterns based on, for example, the person's facial textures and shape.

Facial recognition systems are becoming more widespread. One such application is the use in camera systems. One use is that of identifying a person such as a friend or family member appearing in a video or image, recording in a family home for example. Another system is a security system that uses the person's face as a "key" to unlock a function of a device or access protected information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

As facial recognition and other forms of automated information extraction become increasingly prevalent and sophisticated, challenges around consent are amplified. On the one hand, such systems need to be able to operate effectively, and relatively seamlessly, without placing an undue burden on users and without unnecessarily disrupting the desired functions of the system. On the other hand, it is important that people maintain a level of control over their personal information, including facial recognition and other results extracted using modern information extraction technologies and algorithms.

The present disclosure provides a "dynamic consent" mechanism which balances the need for information extraction in systems to operate effectively with the need to provide people with an acceptable level of control over their personal information.

The dynamic consent mechanism allows people to set their consent preferences dynamically, without having to rely on predetermined consent preferences.

According to a first aspect of the present disclosure, there is provided an information extraction system comprising: an input configured to receive, from a sensor system, incoming sensor signals for monitoring people within a field of view of the sensor system; and one or more processors. The processor(s) are configured to process the incoming sensor signals, and in response to detecting a person located within a notification region of the field of view of the sensor system, cause an output device associated with the sensor system to output a notification to the detected person. The one or more processors are configured to continue processing the incoming sensor signals in order to monitor behaviour patterns of the person after the notification has been outputted, and determine from his behaviour patterns whether he is currently in a consenting or non-consenting state. The one or more processors are configured to implement: (i) an extraction function that attempts to extract identity information about the person irrespective of his determined state, and (ii) a sharing function that determines whether or not to share an extracted piece of identity information about the person with a receiving entity in accordance with his determined state, wherein the piece of identity information about the person extracted when he is determined to be in the non-consenting state is not shared unless and until it is subsequently determined that the person is now in the consenting state.

BRIEF DESCRIPTION OF THE DRAWINGS

To assist understanding of the present disclosure and to show how embodiments of the present invention may be put into effect, reference is made by way of example to the accompanying drawings, in which.

DETAILED DESCRIPTION

The described embodiments provide an information extraction system which allows a bystander to either consent to personal data being shared with a receiving entity or not in real-time, such that the extracted information is only shared if the bystander consents. In the described embodiments, the system selectively shares, with a user of the system, information about bystanders in the user's vicinity, subject to the bystanders' dynamic consent preferences.

Instead of sharing the bystander's personal data with the receiving entity as soon as it is extracted, the bystander must consent to this sharing, giving the bystander greater control over his data.

Consent can be given in a number of ways. One example is that of moving into a consent region, or conversely avoiding the consent region to decline consent. Consent may be given in other ways, such as by a predefined consent gesture.

The way in which consent is given simulates how humans give consent to their identity being shared in real life. For example, if a bystander does not want to interact with a subject, the bystander moves such that he is no longer in the path of the subject or turns so that he is no longer facing the subject. However, if the bystander wants to interact with the subject, he looks at the subject and moves into the subject's line of sight to be within a relatively short distance of the subject, for example within a few metres. Such human behaviours are mirrored by the predefined consent mechanisms.

Figure 1:
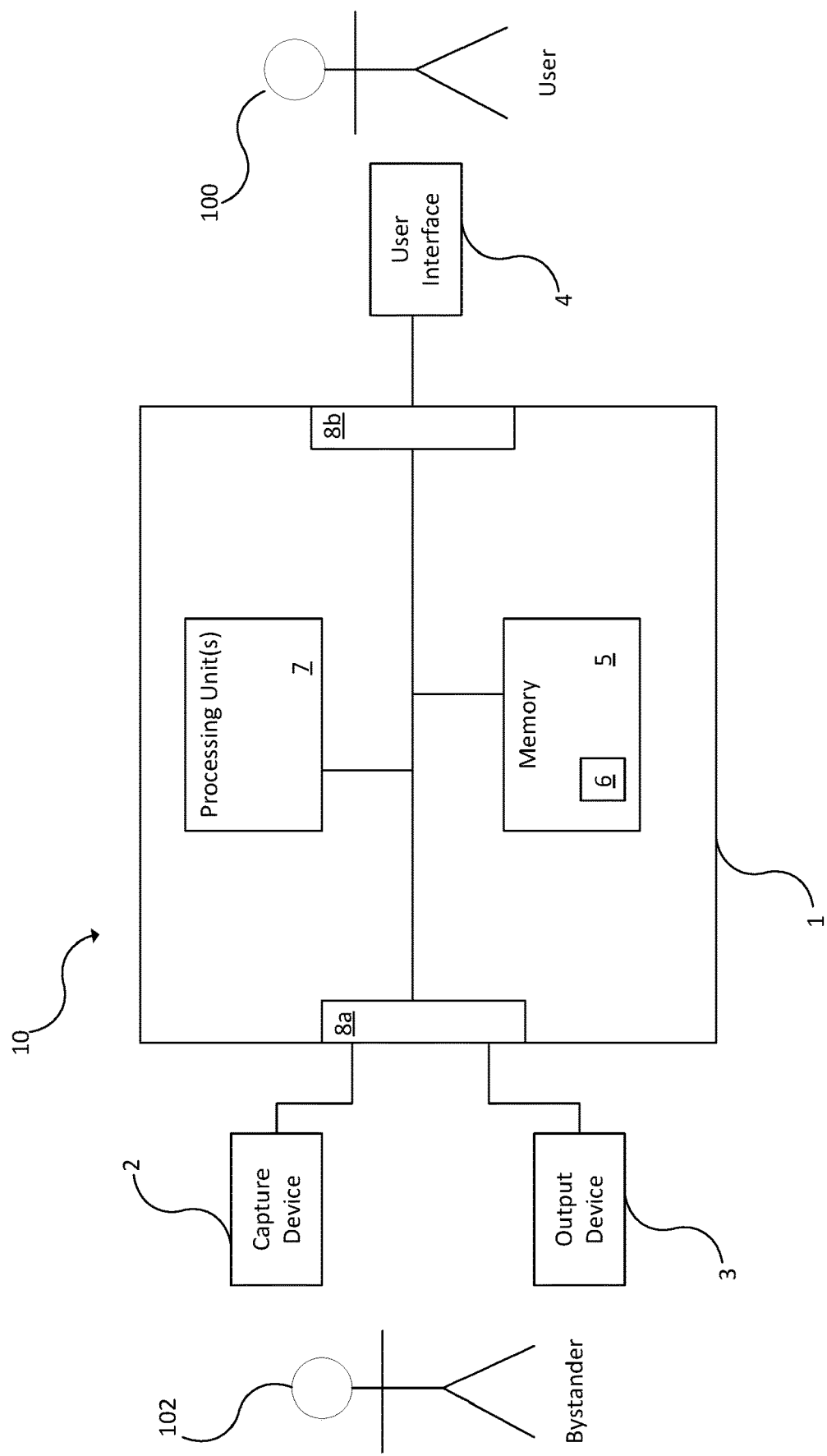
FIG. 1 is a schematic block diagram of an information extraction system at the hardware level.

FIG. 1 shows a schematic block diagram of hardware of an information extraction system 10. The information extraction system 10 comprises a computer device 1, one or more sensor systems comprising at least one capture device 2 (one or more sensors), an output device 3 (also referred to herein as a notification device), and a user interface 4. Although the present example comprises a computer device 1, more generally the described functions can be implemented by any computer system comprising one or more multiple devices, in a localised or distributed arrangement. The capture device 2, output device 3, and user device 4 are each connected to the computer device 1 via one or more data interfaces such as I/O ports 8a, 8b. The devices 2, 3, 4 may be connected to the computer device 1 using any wired or wireless means. The capture device 2, output device 3, and user interface 4 may be integrated components of the computer device 1, or they may be external and connected to it via wireless or wired connections. One or both of the computer device 1 and user device 4 may be local devices, such that they are located within the vicinity of the capture device 2, or one or both may be remote devices, such that they are located at a remote location.

The capture devices 2 capture information relating to a bystander 102. Such a capture device may take the form of a camera such that the captured information is in the form of images or video frames. The captured information is transmitted or otherwise provided to the computer device 1 as sensor signals.

The computer device 1 comprises a memory 5, one or more processing units 7, and the one or more I/O ports 8a, 8b. The memory 5 stores one or more computer programs 6 which, when implemented by the processing unit(s) 7, process the senor signals and determine when the output device 3 outputs notification to the bystander 102 and when the user interface 4 outputs information to a user 100 (one example of a receiving entity).

Figure 2:
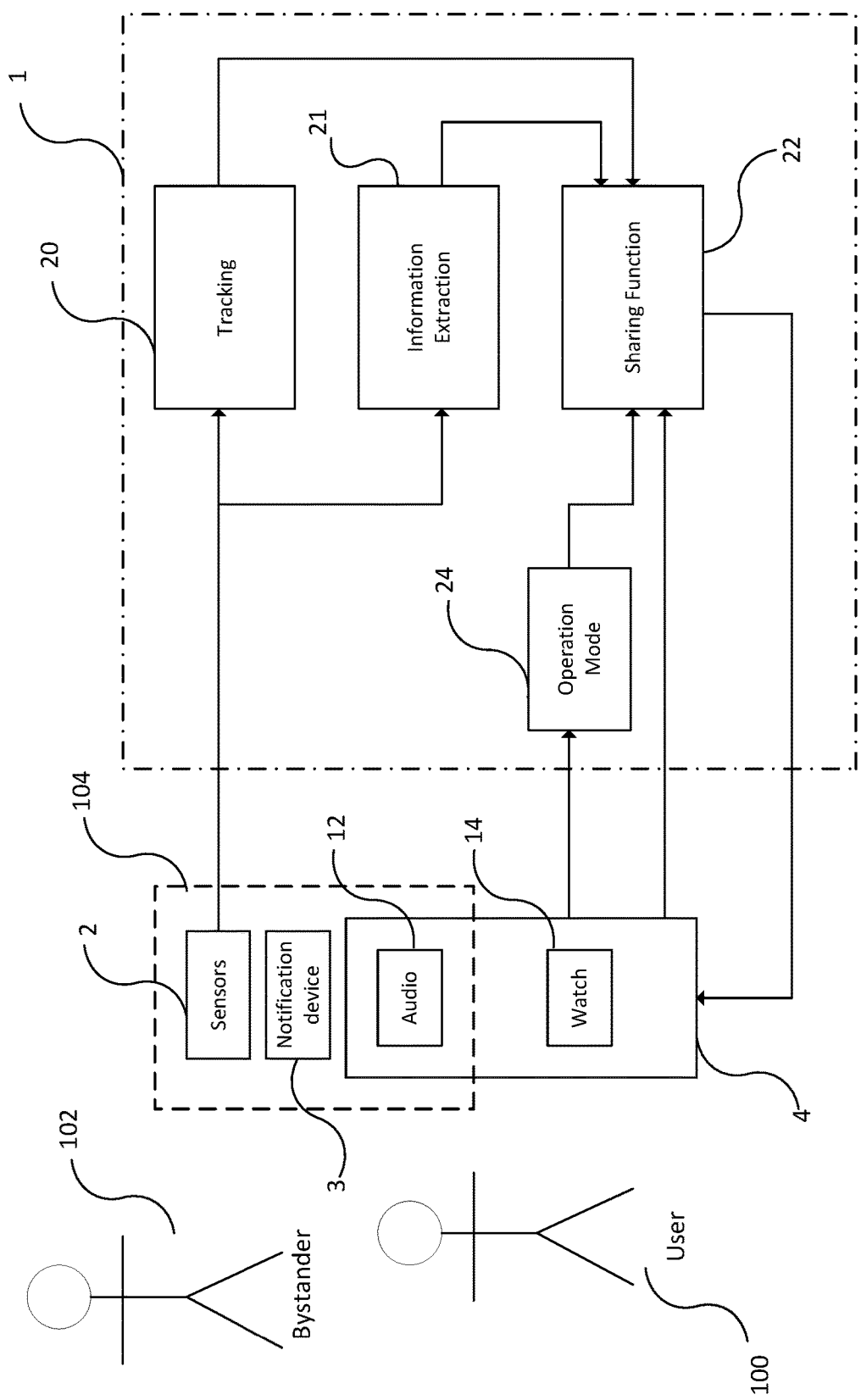
FIG. 2 is a schematic functional block diagram of the information extraction system.

FIG. 2 shows a schematic block diagram of certain functional components of the information extraction system 10, which generally represent different aspects of the system's functionality.

One example in which the information extraction system 10 may be implemented is in aiding interactions between a visually impaired user 100 and bystanders 102. FIG. 2 shows how the system may be used in such a scenario.

Two physical devices are provided to the user 100: an information selector 14 and a head-mountable wearable device 104 (headset). The information selector 14 is also wearable, and takes the form of a watch, for example. In some embodiments, the information selector 14 is provided in the form of an application (app) on a user device such as a mobile phone.

The wearable device 104 comprises an audio output device 12 and at least one capture device 2 (also referred to herein as a sensor), which takes the form of an image capture device(s) (camera in the following examples). The audio output device 12 provides the user 100 with an audio description of the results of tracking and information extraction, as described later. The audio device 12 of the headset 104 and the separate information selector 14 constitute a user interface 4 available to the user 100. The user interface 4 may comprise other types of user input/output devices such as haptic devices.

The notification device 3 of FIG. 1 also forms part of the headset 104, but serves as an "external" interface for notifying the bystander 102 of the tracking. That is, whilst the user interface 4 is provided for the benefit of the user 100, the notification device 3 is for the benefit of the bystander 102. In some embodiments, a single interface acts as both the user interface 4 and notification device 3. For example, the audio output device 12 may both communicate information to the user 100 and notify the bystander 102.

Sensor signals from the sensors 2 are input into a tracking module 20. The sensor signals are used to derive a three-dimensional (3D) image which comprises a snapshot of the depth data associated with each image frame, the depth data being derived through any suitable method, as known in the art. Using the example of the sensors 2 being cameras, the tracking module 20 detects one or more bystanders 102 in the image frames and tracks each detected bystander 102 over multiple frames. While the tracking module 20 may be said, in one sense, to identify bystanders—insofar as it determines correspondence between bystanders detected across different frames (i.e. it determines that a bystander detected in one frame is the same as a bystander detected in another frame) to the extent possible—it is not attempting to attribute a specific human identity to any bystander. A detected bystander for which no further information is available is classified within the system as "unknow", and unknown bystanders are tracked in substantially the same way as "known" bystanders or "familiar" bystanders (see below).

Tracking may be based on facial pose detection which attempts to fit a generic 3D facial model to objects in the 3D frames. The use of the generic 3D facial model allows humans to be identified in the frames and the general orientation of each detected human. The approximate location of each detected human can also be found using pose detection. 3D pose and 3D location can be estimated by fitting a 3D facial model to 3D sensor data. The image capture device or devices 2 may take the form of 3D image equipment for capturing 3D special information (e.g. via one or more of stereo imaging, shaded light sensing, time-of-flight, etc.).

The sensor signals are also used by an information extraction module 21 to extract information about each of the bystanders 102 in the video stream where possible. With facial recognition, a facial template or other set of facial features is extracted, which in turn can be matched to other personal information, such as a name of the bystander, using facial recognition techniques as known in the art. The term "extracted information" covers not only data extracted directly from the sensor signals (such as facial features) but can also refer to other data obtained using the directly-extracted data (such as a name or other identity data obtained via facial recognition).

Information extraction results are linked to the bystander tracking where possible.

A "known" bystander is one for which a piece of external identity information, such as a name, has been successfully extracted. A bystander is classed as "familiar" if the level of information extracted is sufficient to conclude that the system has encountered the same bystander before (even is no external identity information is currently available), and earlier information extraction results are stored for the purpose of identifying familiar bystanders in the future.

An operation mode module 24 determines an operation mode of the user interface 4. The user 100 can select the operation mode using the information selector 14. The operation mode determines the type of output to be presented to the user 100.

There are at least two possible operation modes: line of sight (LoS) and global.

In the LoS operation mode, the user 100 is given information about the bystander 102 directly in front of him (or in his line of sight) within a predefined distance, referred to as a social distance. The user 100 may choose this operation mode when he wants to interact directly with a potential bystander 102. It is also useful for the user 100 as a way to "scope out" the environment in an intuitive way that mimics, to some extent, the experience of a non-visually impaired user.

In the global operation mode, the user 100 is given information about all of the bystanders 102 within a predefined region, referred to as a social region. The social region is defined by the social distance and the radial field of view of the sensors 2. In the global operation mode, the user 100 may be given information such as the total number of bystanders 102 within the social region and where in the social region they are located. He may be given the identities of each of the bystanders 102 in the social region without having to directly "look" at them (i.e. without having to move so that the bystander 102 is in the line of sight). The user 100 may choose this operation mode when he enters a room, for example, and wants to know who else is in the room and some sense of where they are.

The determined operation mode, bystander tracking data, and extracted bystander information are passed to a sharing function 22. The sharing function 22 also receives inputs directly from the information selector 14. The sharing function 22 uses all of the received inputs to determine what information about the bystanders to present to the user 100 and when, as discussed in more detail later.

The sharing function 22 shares the bystander information with the user interface 4. In the example of FIG. 2, the shared information is presented to the user 100 in audio form via the audio output device 12.

Figure 3:
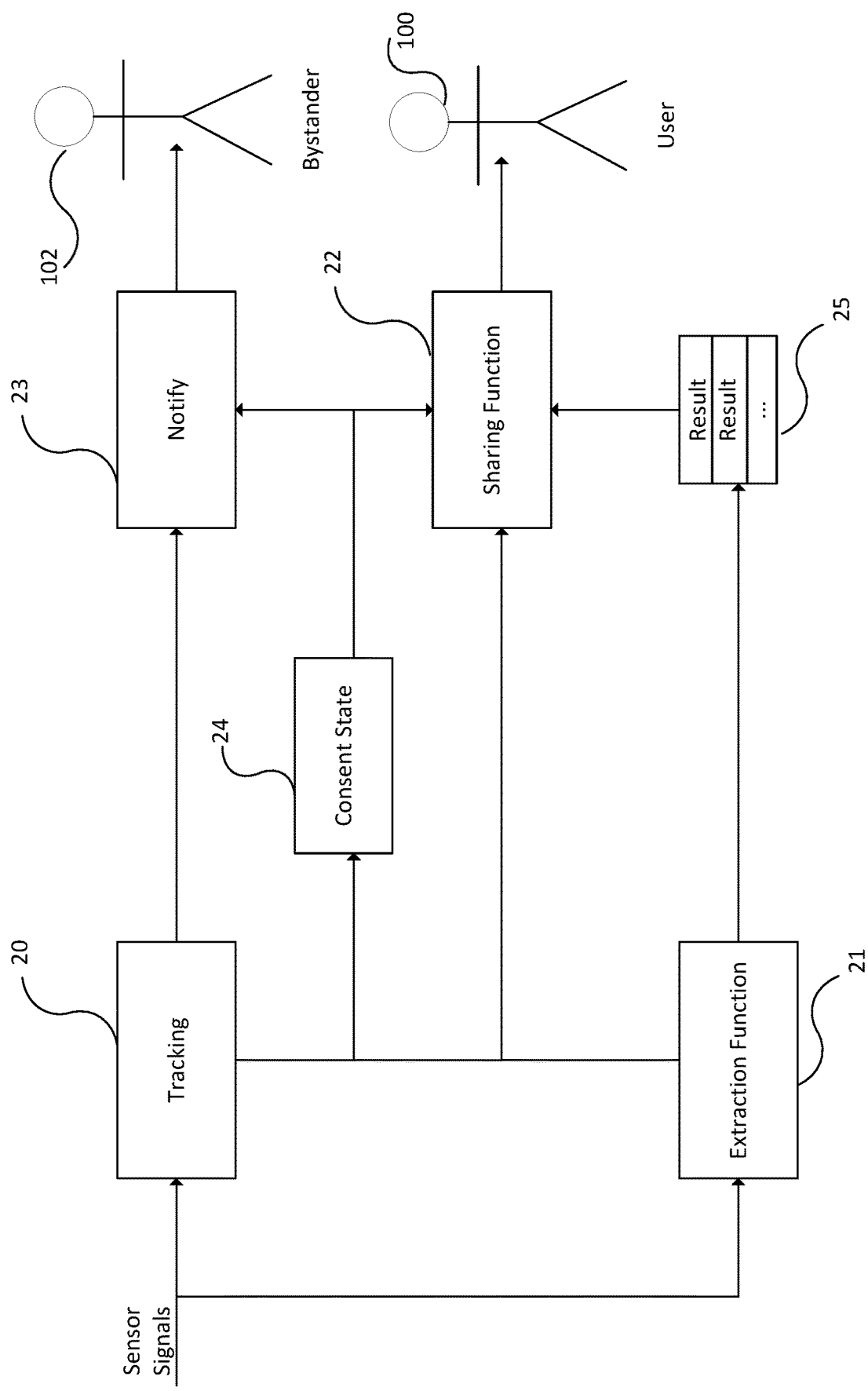
FIG. 3 is a schematic block diagram of certain functions of the information extraction system pertaining to selective information sharing.

FIG. 3 shows the functions performed by the computer device 1 of the information extraction system, in order to share, with the user 100, the extracted information about the bystander 102, subject to their consent.

As described above, the sensor signals are inputs for the tracking module 20 and extraction function 21, which use these to track the location of each bystander 102 and extract information about each bystander 102 in the social region respectively.

The extraction function 21 produces a set of results 25. The results 25 correspond to the bystanders 102 in the social region for whom the extraction function 21 was able to extract information with an acceptable degree of confidence. A result could comprise a defined piece of extracted identity data (such as a name) for known bystanders, or simply an indication that a particular detected bystander is "familiar". A bystander is said to have been identified if he is determined to be known or familiar with sufficient confidence. There is a predefined confidence threshold, below which it is deemed the corresponding extracted information is not reliable enough to be presented to the user 100. Thus, the set of results 25 only includes the extracted information associated with a confidence value above the confidence threshold. The set of results 25 is an input of the sharing function 22. In some embodiments, the results may comprise an indication that the bystander 102 is "new". That is, the system has no information stored about the bystander 102, nor has the system encountered the bystander 102 before. Similarly to extracted information and familiar bystanders, the new result is also associated with a confidence value, and the indication that the bystander is new is only included in the set of results if the confidence value is above the confidence threshold.

In some instances, the set of results 25 will not comprise a result for each bystander 102 in the social region, for example if the bystander 102 cannot be identified with a confidence above the threshold confidence. However, the output of the tracking module 20 comprises data relating to every detected bystander 102 in the social region.

The output of the tracking module 20 is an input to the sharing function 22, a notify module 23 and a consent state module 24.

The consent state module 24 uses the output of the tracking module 20 to determine a consent state of each detected bystander 102. The consent state indicates if the bystander 102 has given his consent for the extracted information about himself to be shared with the user 100. Herein, consent is given "dynamically" and determined through bystander tracking. Dynamically, consent may be given by the bystander 102 in a number of ways, for example by moving into a consent region or remaining in the social region for at least a predefined amount of time. Methods of dynamic consent are described in more detail later. The consent state module 24 uses the tracking information to determine if consent has been given by the bystander 102 by, for example, checking to see if the bystander 102 is in the consent region. The determined consent state is an input to both the sharing function 22 and the notify module 23.

The notify module 23 uses the tracking output and the consent state to determine when and how to notify the bystander 102. The bystander 102 receives the notifications via the notification device 3.

The bystander 102 may be presented with one of two different notifications. If the bystander is in the social region, but has not consented to information sharing, i.e. he is in a non-consenting state, the bystander 102 is notified that he is being tracked. The social region, therefore, can be referred to as a notification region.

If the bystander 102 is in the notification region and has consented to his extracted information being shared with the user 100, i.e. he is in a consenting state, the bystander 102 is notified that his extracted information is being shared with the user 100.

If, however, the bystander 102 is outside of the notification region, he is given no notification. The bystander 102 may still be within the field of view of the sensors 2 and, in that event, is being tracked by the tracking module 20 and his information extracted by the extraction function 21 if possible. This is to improve the responsiveness of the system, to the benefit of both the user 100 and any bystanders 104—no bystander information will be shared until he has consented, and he will always be notified of that possibility upon entering the notification region.

As well as the outputs of the tracking module 20 and the extraction function 21, the sharing function 22 also receives the consent state 24. The sharing function 22 uses the input data to determine what information to output to the user 100 and when.

The sharing function 22 compares the tracking output, results 25, and the consent state of each bystander 102. Each result in the set of results 25 and the corresponding consent state are associated with the relevant detected bystander 102 as detected by the tracker 20 so that the relevant data can be compared for each bystander 102.

If the bystander 102 has consented to his extracted data being shared with the user 100, i.e. the bystander is in a consenting state, the sharing function 22 outputs the extracted data to the user 100 via the user interface 4. If, however, the bystander 102 has not consented to his extracted information being shared, i.e. in a non-consenting state, the sharing function 22 does not share the extracted information with the user 100. In some embodiments, the sharing function 22 outputs only the tracking data to the user 100 if the bystander 102 has not consented to information sharing. For example, the user 100 is informed where the bystander 102 is but not the bystander's identity, even if that identity has been successfully extracted.

In this way, information is extracted about the bystander 102 from the sensor signals but is not used (i.e. shared) unless the bystander 102 has consented to the information being shared.

Figure 4:
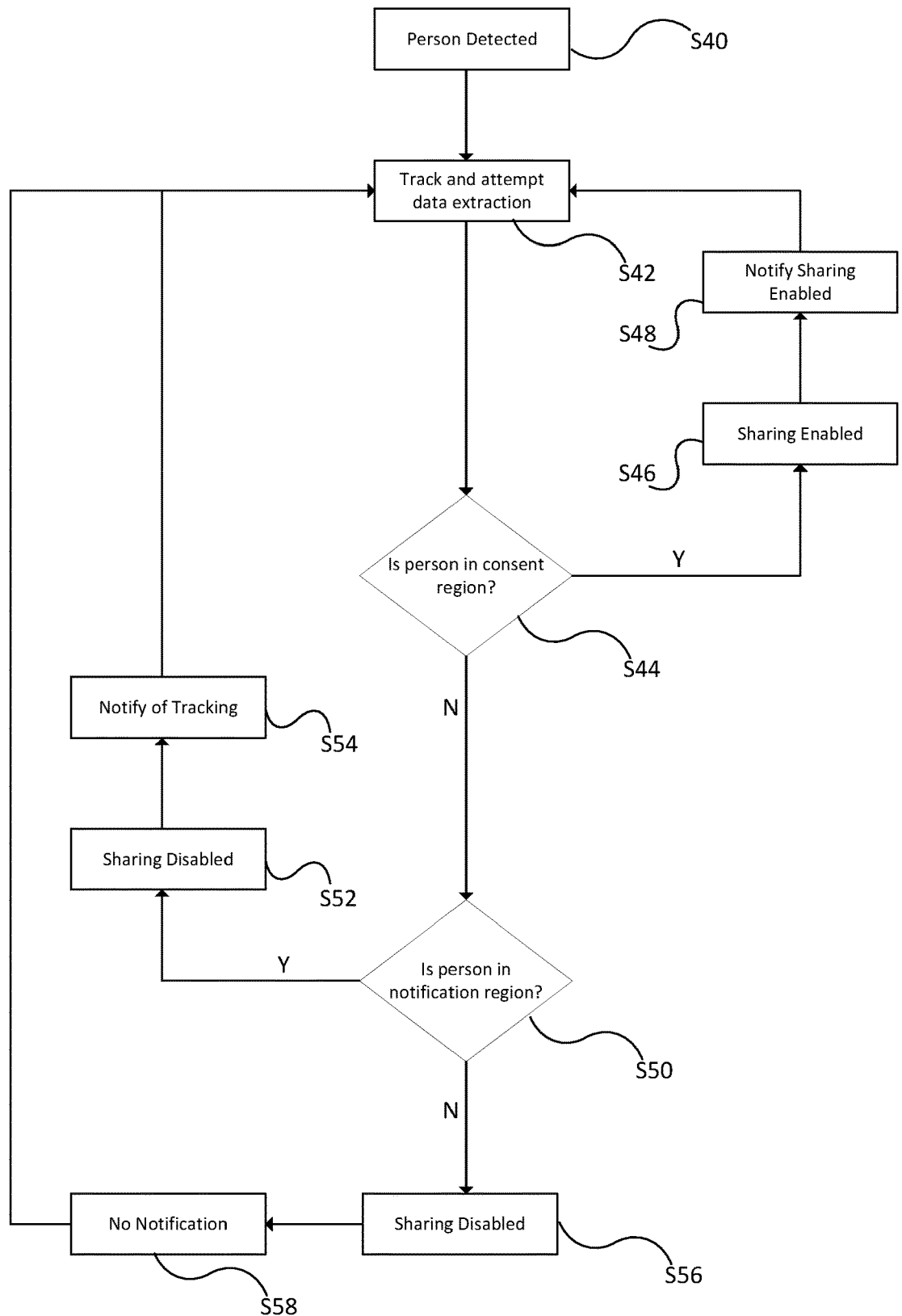
FIG. 4 shows a flowchart for an example method of dynamically managing a bystander's consent to information sharing.

FIG. 4 shows how the sharing function 22 and the notify module 23 determine when to output data and what data to output. In the example of FIG. 4, the bystander 102 consents to information sharing by entering a consent region, and his extracted information is shared immediately upon him so doing. Other examples of dynamic consent are considered below.

At step S40, a person is detected by the sensors 2. This person (or bystander 102) is within the filed of view of the sensors 2 but may not be within the notification region. Once detected, the tacking module 20 starts to track the person and the extraction function 21 attempts to extract data, at step S42.

At step S44, it is determined if the person is in the consent region, i.e. has given his consent to the extracted information being shared with the user 100. If he has consented, sharing is enabled, at step S46, by the sharing function 22 such that the user 100 receives the extracted information via the user interface 4. The bystander 102 is also notified that information sharing is enabled, at step S48, via the output device 3 (i.e. he is notified that he is currently in the consenting state and, accordingly, any extracted information about him might be shared with the user 100). The person continues to be tracked and attempted to be identified, step S42.

If, however, the person is not in the consent region, it is determined at step S50 if he is in the notification region. If he is, sharing is disabled by the sharing function 22 since no consent has been received, step S52, and the bystander 102 is notified that he is being tracked only, step S54. Tracking and identification continues, step S42.

If, however, the bystander 102 is not in the notification region, sharing is disabled since he has not given consent, step S56, and no notification is given to the bystander 102, step S58, since he is not in the notification region. Again, tracking and identification of the detected person continues, step S42.

The process continues for the detected person until he is no longer detected in the field of view of the sensors 2, i.e. until he leaves the field of view of the sensors 2. That is, the person is continuously tracked and identified (if possible), and the system continues to monitor for consent, while the person remains in the field of view of the sensors 2. As indicated above, results are only presented to the user 100 if they have a confidence value above a predefined threshold value. This applies to the identification of both known and familiar people, and in some embodiments also new people, i.e. the system will not identify a person as known or familiar unless it has sufficient confidence in that result. If the bystander 102 has consented to sharing but no information meeting the confidence criterion has been extracted, the bystander 102 may be identified to the user 100 as an unknown person (as opposed to a known, familiar or new person). The sharing function 22 knows that there is a person present but to output an indication of "unknown" identity since it compares the tracking output, which contains all bystanders 102 in the notification region, to the set of results 25, which only contains the bystander identities meeting the confidence threshold. Therefore, it knows when there is a bystander 102 who is unidentified as there is no information about said bystander in the results 25 but there is in the tracking output.

Figure 5:
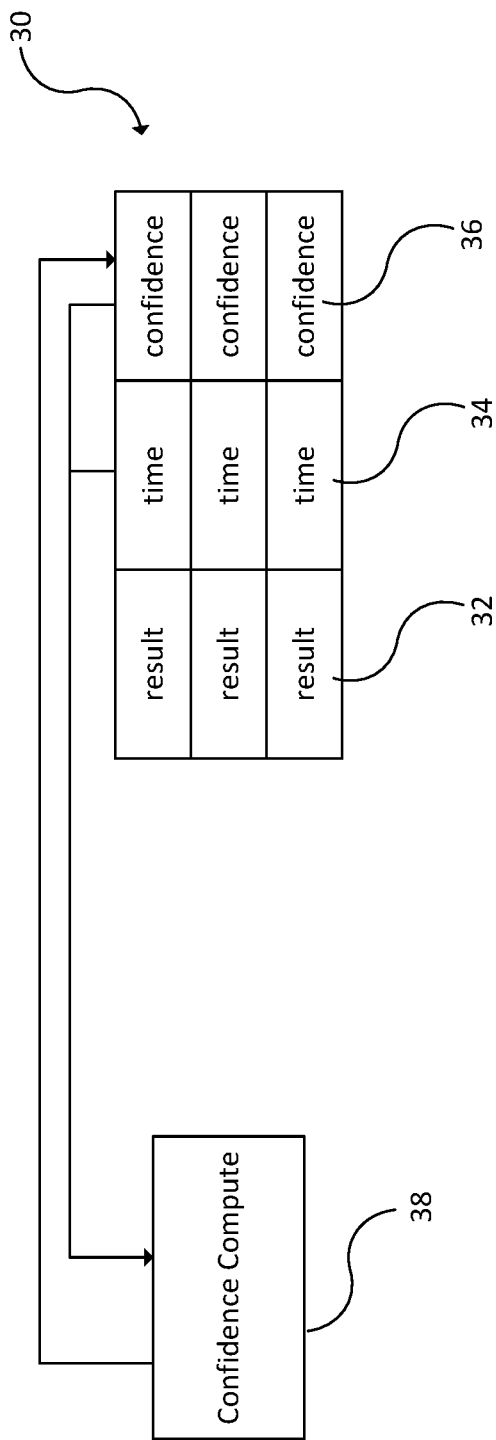
FIG. 5 shows a confidence compute component for updating a confidence associated with a result of a facial recognition process.

FIG. 5 shows how the confidence value associated with each result is computed, in a way that reflects a reduction in confidence over time in the event that the system is no longer able to verify or reproduce that result (e.g. due to a person moving out of view or becoming obstructed).

The information extraction module 21 produces a set of unfiltered results 30. The set of unfiltered results 30 comprises results 32, each result 32 associated with a stored time 34 at which the result was obtained and a stored confidence value 36. The result 32 is the identity of the bystander 102.

When the result 32 is first found, that is the information is first extracted from the sensor signal, the confidence value 36 may be calculated initially as an intrinsic part of the information extraction, e.g. it may take the form of a probability or score provided by a probabilistic or other score based information extraction model. The initial confidence value represents the confidence the information extraction function 21 has in a result at the point at which it is obtained.

The confidence 36 associated with each result 32 is updated as time passes. The confidence 36 and time 34 associated with the result 32 are passed to a confidence compute module 38, which uses these values to recalculate an updated confidence value 36, which is then stored in the unfiltered results table 30 associated with the relevant result 32. Typically, this would reduce the confidence 36 from its initial value as a function of elapsed time since the time 34 it was obtained.

If the updated confidence value 36 drops below the threshold confidence value, the result 32 is withheld thereafter from the sharing function 22 and the bystander 102 would thereafter be identified as "unknown" (irrespective of the bystander's consent state—on the basis that the system is simply too unsure of the bystander's identity).

Although not shown in FIG. 3, the unfiltered results 30 are filtered by confidence value 36 by a filter before being input into the haring function 22.

Some example applications of the information extraction system will now be described.

Wearable Device of Aiding Interactions

Figure 6:
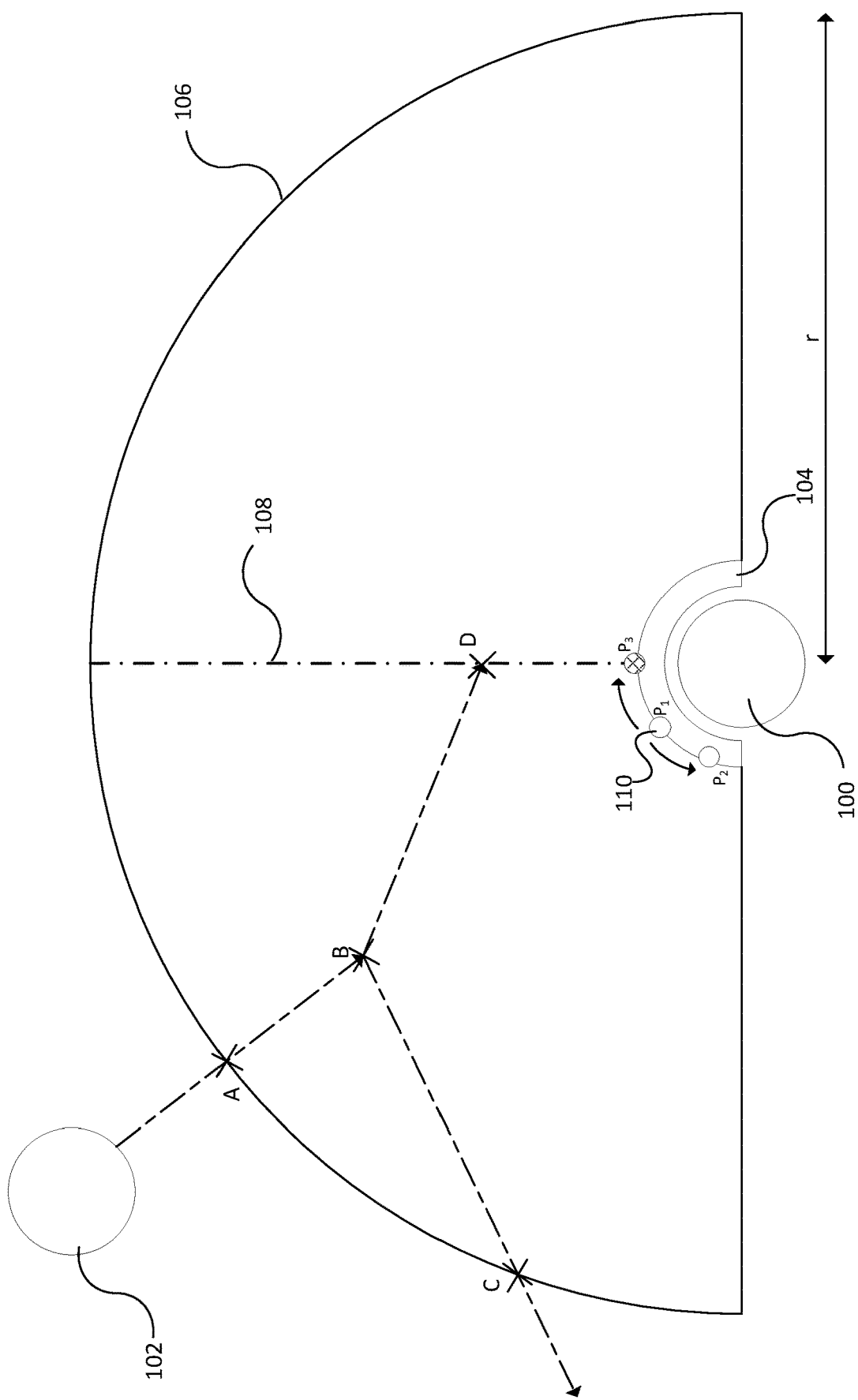
FIG. 6 shows a schematic plan view of an example of the information extraction system used in a social environment to aid interactions between a user and a bystander.

Expanding on the example application set out above, FIG. 6 shows an example of a head-mountable wearable device 104 being used to aid the user 100 and the bystander 102 interact, where the user 100 is visually impaired. The user 100 is wearing the wearable device 104. The wearable device 4 is fitted with sensors 2 in the form of cameras. The cameras are able to capture image data over 180°. An example head-mountable wearable device 104 is described later with reference to FIG. 9.

There is a predefined semi-circular social region 106, with a radius r from the centre of the wearable device 102. The social region is the region in which it would be expected that social interaction between the user 100 and another person would occur. The size of this social region depends on the environment of the user 100. For example, the social region 106 has a smaller radius r when the user 100 is in a busy location, such as on a busy bus where the user 100 is not likely to interact with any bystanders who are not very close to him, than when the user is in a less busy area, such as in a meeting room in which the user 100 may wish to interact with all bystanders in the room. The radius r is adjustable to suit the environment of the user 100. In a relatively non-busy environment, such as a classroom or office, the radius r may be around a metre or a few metres.

The social region 106 defines the area is which bystanders may be announced to the user 100. There is a line of sight 108 which extends from the wearable device 104 to the edge of the social region 106 directly in front of the user 100 (i.e. the line of symmetry of the social region 106).

The notification device 3 comprises a light-emitting element 110 (also referred to as a light), which is used to render visual notifications to the bystander 102. The light 110 tracks the location of the bystander 102 in the social region 106. The light-emitting element 110 emits (white) light to notify the bystander 102 of tracking, the light changing colour (to green) to notify the bystander 102 that his consent has been received.

The bystander 102 is originally outside the social region 106. The user 100 and/or bystander 102 move such that the bystander 102 enters the social region 106 at point A. The user 100 and/or bystander 102 carry on moving until the bystander reaches point B in the social region 106.

As soon as the bystander enters the social region 106, he is being tracked by the tracking module 20. The bystander 102 is given a visual indication that he is being tracked by the wearable device 104. The light 110 on the wearable device 104 indicates that the bystander is being tracked. The light is at the relative radial position of the bystander 102 to the user 100, the light 110 being at position Pi when the bystander 102 is at location B.

When the bystander 102 is being tracked in the social region 106, the light 110 is white. While the light 110 is white, no identification information about the bystander 102 is announced to the user 100. The user 100 may be made aware of the relative radial location of the bystander 102 through the use of haptic or audio devices within the wearable device 104, but no bystander identity is announced to the user 100 while the light 110 is white.

However, while being tracked, the bystander 102 may be identified by the information extraction module 21. Facial recognition is used to identify the bystander 102.

When he has reached point B, the bystander 102 decides he does not want to be announced to the user 100. That is, he does not want his identity revealed to the user 100. The bystander 102 moves to remove himself from the social region 106 by turning left and exiting the social region 106 at point C.

As the bystander 102 moves along the path from B to C, the light 110 also moves to reflect the bystander's relative radial position with respect to the user 100 from $P_1$ to $P_2$ on the wearable device 104. During this time, the light 110 continues to be white since no extracted information about the bystander 102 is being shared with the user 100.

Once the bystander 102 leaves the social region 106 at point C, the light 110 stops tracking the movement of the bystander 102 and turns off If, however, when the bystander 102 is at point B, he decides he wants to be identified to the user 100, he moves into the line of sight 108 of the user 100. When he intersects the line of sight 108 at point D, the bystander 102 is announced to the user 100. If the bystander 102 is known to the user, the system will announce his name (i.e. share the extracted information with the user 100). If, however, the bystander 102 is unknown to the user 100, the system will inform the user 100 as such. In some embodiments, the system may differentiate between "familiar strangers", who are people who have been seen before but are unlabelled such that no name can be announced, and strangers who have never been encountered by the information extraction system 10 before.

As the bystander moves from B to D, the light 110 follows the location of the bystander 102. Once the bystander 102 intersects the line of sight, the light 110 turns green. This indicates to the bystander that he has been identified to the user 100. The line of sight 108 is therefore used to define the consent region.

The bystander 102 is announced to the user 100 via an audio output, which gives the bystander's name or other form of extracted information to the user 100. The bystander 102 mays only be announced to the user 100 when he first enters to the consent region, or, if the bystander 102 remains in the consent region for at least a predefined time interval, the bystander 102 may be announced to the user 100 after each passing of said time interval while he remains in the consent region.

If the bystander 102 moves out of the line of sight 108, the light 110 turns white since the bystander 102 is no longer consenting to information sharing.

The light 110 is a form of external interface or notification device 3 which presents information to the bystander 102. The type of information to be displayed to the bystander 102 is chosen based on the information that the bystander 102 needs to know in order to decide where to move in relation to the user 100.

There may be some situations in which there is more than one bystander 102 in the social region 106. In such a situation, the location of all of the bystanders 102 are tracked by the system. The tracking of each bystander 102 in the social region 106 may be visualised by a different light 110 on the wearable device 104. However, such an embodiment is not preferable as it becomes unclear which light 110 is tracking which bystander 102 with large numbers of bystanders 102 or bystanders 102 who are close to each other.

In the preferred embodiment, the light 110 only tracks the location of the closest bystander 102. The closeness of the bystander 102 may be determined in one of two ways.

The closest bystander 102 may be the bystander 102 who is physically closest to the user 100 in any direction. For example, a bystander who is 0.5 m from the user 100 directly to the right of the user 100 is closer to the user 100 than a bystander 102 who is 1.5 m away from the user 100 but at an angle of 20° to the line of sight 108. In such an embodiment, the bystander 102 to the right of the user 100 is tracked by the light 110.

Alternatively, the closest bystander 102 may be defined as the bystander 102 who is closest to the line of sight 108. That is, the bystander 102 who is most likely to intersect the line of sight 108 first. In the example given above, the bystander at 1.5 m from the user 100 but at only a 20° angle to the line of sight 108 is the closest user and so is followed by the light 110.

The light 110 may be embodied by an LED array front-mounted on the headset, or another form of external display. In the above example, it can be one of two colours, indicating if the bystander 102 is being tracked (white) and when he is being announced (green). In some embodiment, the light may be used to give the bystander 102 more information about the data being shared with the user 100 about him. For example, the light 110 may be green when a known bystander is announced, i.e. his name is given, orange when a familiar stranger is announced, and red when an unknow stranger is announced. This provides the bystander 102 with a more information about the data being given to the user 100 so can aid the interaction between the user 100 and the bystander 102. For example, if the light 110 indicates to the bystander 102 that he has been announced as a stranger, the bystander 102 knows he needs to introduce himself to the user 100.

The light 110 may be used earlier to inform the bystander 102 what data will be announced to the user 100 if the bystander 102 consents to information sharing. For example, the light displayed while tracking may be of a different colour depending on whether the user is identified, a familiar stranger, or unknown. This information may aid the bystander 102 in deciding whether to consent to his information being announced (i.e. decide whether to move into the line of sight 108).

The bystander 102 is required to give his consent to being announced each time he is being tracked in the social region 106. That is, the system does not learn who to announce and who not to announce, but rather allows the bystander 102 to decide each time he is near the user 100 whether he wants to be announced to the user 100 that time. This is one example of a "dynamic consent" mechanism.

The bystander 102 may be tracked and identified by the information extraction system 10 when he is outside of the social region 106. The system may begin tracking and identification as soon as the bystander 102 is within range of the cameras of the wearable device 104. This allows the system to be able to immediately notify the bystander 102 that he is being tracked when he enters the social region 106 and announce the bystander 102 when he intersects with the line of sight 108. In this embodiment, the bystander 102 is tracked and identified while at his initial location outside the social region 106 and continues to be tracked and identified when he leaves the social region 106 at point C.

In some embodiments, the bystander 102 is only identified to the user 100 if he is making eye contact with the user 100 while on the line of sight 108. This indicates to the system that the bystander 102 wants to interact with the user 100, so should be announced. This condition for announcement of the bystander 102 to the user 100 reflects the way in which humans physically display consent.

Figure 9:
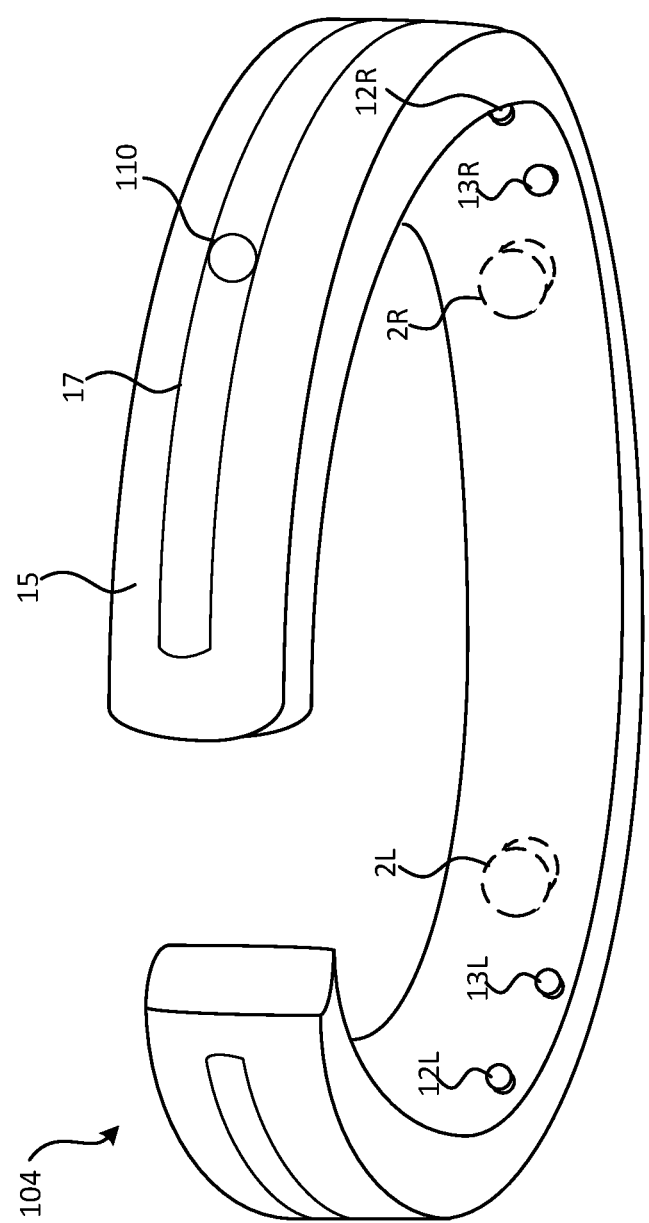
FIG. 9 is an example of a wearable device which may be used to house the information extraction system in certain embodiments.

FIG. 9 shows an example head-mountable wearable device 104 (headset).

The wearable device 104 comprises a headpiece 15, which is a headband, arranged to be worn on the wearer's head. The headpiece has an inner curvature intended to wrap around the wearer's head above their ears.

For ease of reference herein, all description pertaining to the left-hand component also pertains to the right-hand component because the components are essentially identical apart from being mirror images of each other.

The wearable device 104 also comprises one or more cameras 2—stereo cameras 2L, 2R mounted on the headpiece 15 and configured to capture an approximate view ("field of view") from the user's left and right eyes respectfully in this example. The cameras are located towards either side of the user's head on the headpiece 15, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

Left and right channel speakers, earpiece or other audio output transducers are to the left and right of the headband 15. These are in the form of a pair of bone conduction audio transducers 12L, 12R functioning as left and right audio channel output speakers. These form part of the user interface 4 in this example.

The headband 15 also comprises a, LED array 17 (i.e. a basic external display). The light 110 is an illuminated section of the LED array, the illuminated section moving to follow the movements of the bystander 102. The LED array 17 extends at least as far as the notification region so that the light 110 can track the bystander 102 in all areas of the notification region.

The wearable device 104 may comprise other components that are not shown, such as dedicated depth sensors, additional interfaces, one or more loudspeakers, etc.

Though not evident in FIG. 9, the processing units 7 and memory 5 are housed in the headband 15. Alternatively, these may be housed in a separate housing connected to the components of the headband 15 by wired and/or wireless means. For example, the separate housing may be designed to be worn as a belt or to fit in the wearer's pocket, or one or more of these components may be housed in a separate computer device (smartphone, tablet, laptop or desktop computer etc.) which communicates wirelessly with the sensors, lights, and audio devices apparatus in the wearable device 104, whereby the headset and separate device constitute the information extraction system 10.

Internet Connected Camera

Figure 7:
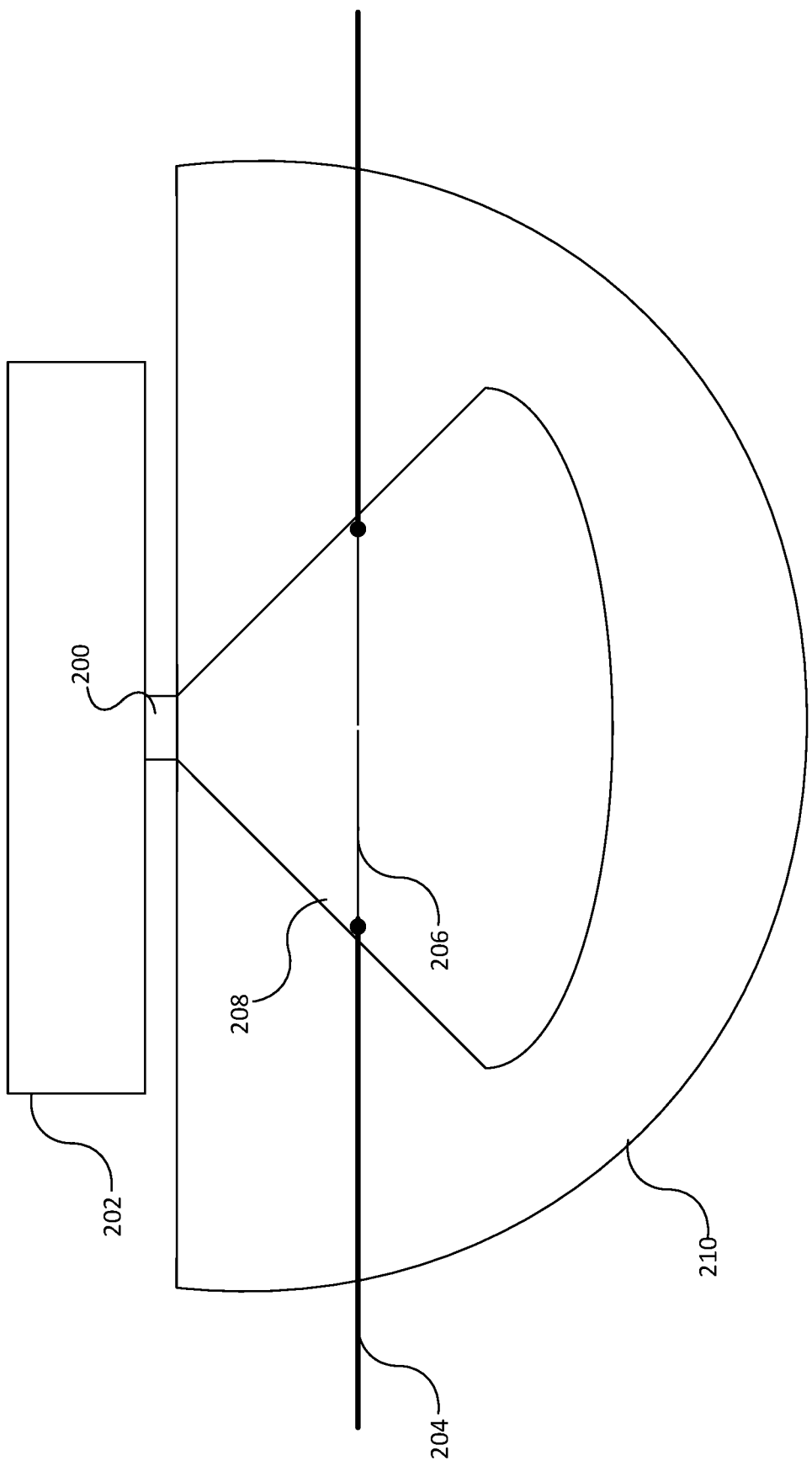
FIG. 7 shows a schematic plan view of an example of the information extraction system used as part of a video system.

FIG. 7 shows an alternative embodiment in which the present invention may be implemented in a video system that provides a video streaming service. In this case a user can access recorded video, still images and live video as well as receive notifications of the identity of people recognised by the system. Note that the information extraction system as shown in FIG. 2 applies in this application, however different user interfaces 4 are used. The user interface 4 may be a remote computer device via which the user 100 is able to access an online platform, for example, which allows him to view recorded video and extracted information. Alternatively, the receiving entity 100 may be a remote computer system or a storage device, which could be the database or system of an organisation. The sensors 2 and notification device 3 are present at the location shown in FIG. 7, but are not housed with any user interfaces 4. The notification device 3 may be housed together with the sensors 2 or may be provided separately.

A camera 200 is positioned on a building 202, which is behind a wall 204. Access to the building 202 is through a gate 206. Information captured by the camera 200 is passed to a receiving entity such as the building owner, a cloud service provider, or recorded security computer system.

The camera 200 has a notification region 210. People entering the field of view of the camera 200 are tracked and notified of the tracking when they enter the notification region 210. The notification region 210 may be the same size or smaller than the camera field of view.

An external interface, such as the tracking light 110 disclosed with reference to FIG. 6, is provided. This may be positioned on the camera 200 or may be separate. The external interface indicates to the people in the notification region 210 that they are being tracked.

Inside the notification region 210 is an identity sharing, or consent, region 208. When a person enters the identity sharing region 208, the identity of the person is shared with the receiving entity. When the person's identity is shared, the external interface indicates the sharing to the person.

The location and size of the sharing region 208 is defined such that it provides useful information to the receiving entity. Here, the sharing region 208 encompasses the gates 206 so the receiving entity will receive information about who is entering and exiting the premises.

The sharing region 208 may also be defined such that it matches the behaviours that are encouraged. Here, one function of the camera 200 is to deter intruders. The sharing region 208 encompasses the gates 206 (the entrance to the premises) to discourage intruders from entering the premises. If an intruder does enter, his identity will be shared.

In a similar way to the wearable device described above, the person must consent to his data being shared. Consent is given by the person entering the identity sharing region 208. The person can refuse his data being shared by not entering the sharing region 208 and exiting the notification region 210. That is, the person consents to information sharing dynamically. This is the case even when sharing is not dynamic, for example, in recorded systems where, once consent is given, the person cannot unconsent as his identity will be stored with the recorded video. This is different to the example of the wearable device for aiding interactions where, if the bystander 102 no longer wants to consent, he removes consent by exiting the consent region. He will have been announced to the user 100 upon entering the consent region, but will not be announced again (unless he re-enters the consent region).

Upon consent being received, the extracted information about the person is sent to the receiving entity. It may be rendered to the receiving entity via an audio output device 12, as in the previous example. However, in a video system which may be recorded or in which the extracted information and the footage may be augmented, it may be more useful for the identity to be rendered to the receiving entity visually. For example, the video may be marked-up so that the extracted information is rendered on the video, for example by providing the identity of the person next to their image in the video. The identity of the person may be provided in a text section of the user interface at the same time as the video is shown in a video section of the user interface.

The tracking light 110 is just one type of external interface which may be used to indicate to the bystander 102 that he is being tracked and when his data is announced. The external interface may comprise a display for displaying a video stream of images collected by the camera, the images being edited to include indications of when bystanders are being tracked and shared. The external interface may comprise speakers for outputting audio. The bystander may be informed that he is being tracked and announced by different sounds.

In the example of FIG. 6, the bystander 102 consents to his data (here, his name) being announced to the user 100 by way of moving into the line of sight 108. This is a form of active consent. If the bystander 102 does not consent, he removes himself from the social area 106 such that, even if the user 100 were to turn such that the bystander 102 was directly in front of the user 100 (i.e. along an extended line of sight 108), the bystander 102 would not be announced to the user 100 since he is outside of the social area 106.

The bystander 102 may refuse consent in other ways. For example, the bystander 102 could turn his face away from the user 100. There may be other gestures the bystander 102 can use, such as raising a hand, which indicate that he does not consent to his data being shared. It will be appreciated that some uses of the described technology may not provide a method of refusing consent by a gesture. For example, a bystander may only be able to refuse consent by not entering the identity sharing area when the present technology is used in a security system.

By refusing consent, no extracted information about the bystander 102 is shared. That is, he is not announced at all to the user 100. This is different to the bystander 102 performing a gesture which prevents the information extraction module 22 from identifying the bystander 102, for example by blocking his face from view. If the bystander performs such a gesture but consents to information sharing, he is still announced to the user 100 but as an unknown person.

The bystander 102 may be able to consent to his information being shared by performing a predefined consent gesture, for example by waving. Gaze detection may be used to determine the direction in which the bystander 102 is looking. In such an embodiment, the bystander 102 may consent by looking at the user 100.

Consent may be given by way of an audio signal. For example, the bystander 102 may consent by saying the user's name or by saying a greeting such as "hello". If there is any sound generated from the location of a bystander 102 which is above a volume threshold, the bystander 102 may be deemed to have consented. The volume threshold may be determined by the environment of the user 100 and an expected volume of a bystander 102 interacting with the user 100 in said environment. In such embodiments, the sensors 2 would comprise at least one microphone.

In some embodiments, the bystander 102 may have his data shared if he passively consents. For example, the bystander's data may be shared after a predefined time period if he does not give an indication that he does not consent to the sharing within a predefined time period. Declining consent may be through a gesture or by the bystander removing himself from the tracking area. That is, the bystander passively consents by reaming in the tracking area for at least the predefined time period and not preforming the decline consent gesture within said time period.

Bystanders may be able to consent or decline consent by way of a visual indication such as a badge. If the visual indication is detected, this indicates that the bystander either consents or does not consent to his data being shared.

It will be appreciated that the consent mechanism implemented may be any combination of the above-mentioned mechanisms. For example, the bystander 102 may consent to information sharing if he remains in the social region for the predefined period of time and does not perform the non-consent gesture (or performs the consent gesture).

Figure 8:
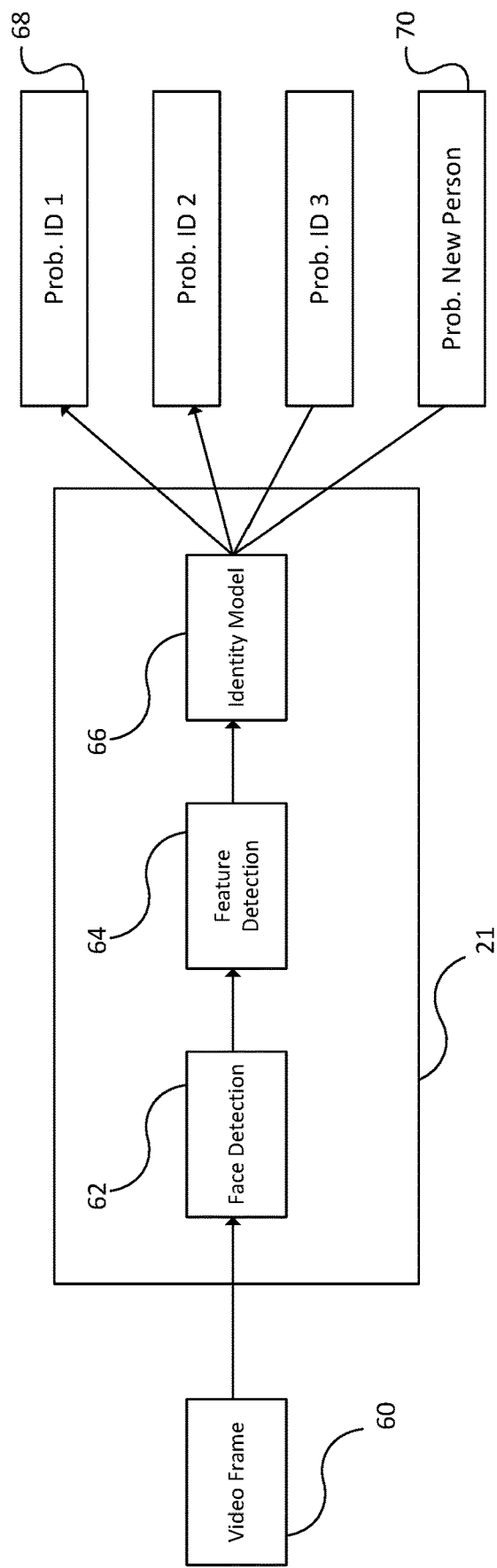
FIG. 8 is a schematic block diagram of an information extraction module.

FIG. 8 is a schematic diagram of the information extraction module 21, illustrating how the set of unfiltered results 30 is derived. A video frame 60 is input into the information extraction module 21 and is processed by a face and/or pose detection module 62 to detect regions of interest in the video frame 60. A feature detection module 64 attempts to detect features in the identified regions of interest.

The detected features are used by an identity model 66 to attempt to match the detected features to an identity. A set of identities is stored. The set of identities may include both labelled identities, e.g. Alice, Bob, etc., and unlabelled identities, e.g. Familiar Stranger 1, Familiar Stranger 2, etc. Each identity in the set of identifies is associated with an ID number. The identity module 66 calculated a probability 68 that the detected features are associated with each of the ID numbers. The identity model 66 also calculates a probability that the detected features are those of a new person 70.

The identity associated with the ID number with the highest probability 68, 70 is determined to be the result 32 for said bystander. The probability 68, 78 is used to derive the confidence value 36. The unfiltered results 30 are filtered by confidence and only input to the sharing function 22 if the confidence 36 is above the confidence threshold.

The disclosed information extraction system could be applied to other kinds of feedback systems. For example, other modalities such as audio could be used, or the system could be implemented on a personal device.

Other information may be used to modify the consent state. For example, beyond location, gestures, time-in-frame, or voice signals may be used to signify consent or non-consent. Contextual information may also be used, such as activities, time of day, signals from companion technologies such as privacy setting on phones, etc.

The presence of bystanders 102 may be communicated to the user 100 in a number of different ways depending on the level of information extracted about the bystander 102. For example, an unknown bystander 102 may be communicated to the user 100 by a "clicking" sound and an identified bystander 102 by a "bump" sound. These sounds may be played to the user 100 while the bystanders 102 are in the notification region and in a non-consenting (but still supressing the extracted information, e.g. bystander identity, until consent is given), or only when the bystander 102 is in the consenting state in the notification region. The sounds may be played such that they appear to be coming from the location of the bystander 102. For example, if the unknown bystander is 1 m away from the user 100 to the left, the clicking sound is played such that it appears to be originating from a point 1 m away from the user 100 to the left (i.e. the location of the bystander 102). In some embodiments, a click is played for any detected object (in some embodiments, any object above a size threshold) and a bump sound played when it is detected that there is a face (i.e. that the detected object is a person).

In the above example, the bystander 102 is given a visual notification that he is being tracked and/or his information is being shared with the user 100. In some embodiments, the bystander 102 is notified in other ways. For example, the bystander 100 may be notified via an audio output device 12. The audio output device 12 may be the same as the audio output device 12 communicating with the user 100, such that the bystander 102 hears the same information as the user 100, or the audio output device 12 notifying the bystander 102 may be different to that which communicates information to the user 100.

According to a first aspect of the present disclosure, there is provided an information extraction system comprising: an input configured to receive, from a sensor system, incoming sensor signals for monitoring people within a field of view of the sensor system; and one or more processors configured to process the incoming sensor signals, and in response to detecting a person located within a notification region of the field of view, cause an output device associated with the sensor system to output a notification to the detected person; wherein the one or more processors are configured to continue processing the incoming sensor signals in order to monitor behaviour patterns of the person after the notification has been outputted, and determine from his behaviour patterns whether he is currently in a consenting or non-consenting state; and wherein the one or more processors are configured to implement: (i) an extraction function that attempts to extract information about the person irrespective of his determined state, and (ii) a sharing function that determines whether or not to share an extracted piece of information about the person with a receiving entity in accordance with his determined state, wherein a piece of information about the person extracted when he is determined to be in the non-consenting state is not shared unless and until it is subsequently determined that the person is now in the consenting state.

The one or more processors may be configured to determine the person to be in the consenting state when located in a consenting region of the notification region, and the non-consenting state when located in a non-consenting region of the notification region.

The one or more processors may be configured to determine the person to be in the consenting state when the person performs a predetermined consent gesture when located in the notification region, and the non-consenting state if the person has not performed the consent gesture in the notification region.

The one or more processors may be configured to determine the person to be in the consenting state when the person remains in the notification region for a predefined period of time, and the person is in the non-consenting state prior to the expiry of said predefined period of time.

The person may remain in the non-consenting state after the expiry of the predefined period of time if the person performs a predefined non-consent gesture before expiry of the predefined period of time when located in the notification region.

The extraction function may comprise a facial recognition process, a pose tracking process, and/or an object tracking process.

The receiving entity may be a user, and the information is shared with the user via a user interface.

The user interface, the sensor system and the output device may be embodied in a wearable device.

The receiving entity may be an external computer system or storage device, and the information is shared therewith with a data interface of the information extraction system.

The notification may be rendered to the person as a visual or audio notification, the one or more processors configured to update the notification in response to changes in the behaviour pattern of the person.

A confidence value may be calculated for each piece of extracted information, the piece of extracted information only being shared with the receiving entity if the confidence value is greater than a predefined confidence threshold.

According to a second embodiment of the present disclosure, there is provided a computer implemented method of extracting information about a person, the method comprising: receiving from a sensor system incoming sensor signals for monitoring people within a field of view of the sensor system; and processing the incoming sensor signals, and in response to detecting a person located within a notification region of the field of view, cause an output device associated with the sensor system to output a notification to the detected person; wherein the processing of the incoming sensor signals continues in order to monitor behaviour patterns of the person after the notification has been outputted, and determine from his behaviour patterns whether he is currently in a consenting or non-consenting state; and wherein:

(i) an extraction function attempts to extract information about the person irrespective of his determined state, and (ii) a sharing function determines whether or not to share an extracted piece of information about the person with a receiving entity in accordance with his determined state, wherein a piece of information about the person extracted when he is determined to be in the non-consenting state is not shared unless and until it is subsequently determined that the person is now in the consenting state.

The person may be determined to be in the consenting state when located in a consenting region of the notification region, and the non-consenting state when located in a non-consenting region of the notification region.

The person may be determined to be in the consenting state when he performs a predetermined consent gesture when located in the notification region, and the non-consenting state if he has not performed the consent gesture in the notification region.

According to a third embodiment of the present disclosure, there is provided a computer program, stored on a transitory or non-transitory storage medium, for programming a computer system to implement the functionality or steps of any preceding claim.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. An information extraction system comprising:
an input device configured to receive, from a sensor system, incoming sensor signals to monitor people within a field of view of the sensor system; and
a processor configured to:
    detect a presence of a person within a notification region of the field of view of the sensor system, the notification region being smaller than the field of view, the notification region comprising a non-consenting region and a consenting region;
cause an output device associated with the sensor system to render a notification to the person upon detecting the presence of the person within the notification region;
determine the person to be consenting when the person is located in the consenting region of the notification region, and non-consenting when the person is located in the non-consenting region of the notification region, wherein the notification to the person in the non-consenting region is a first type of notification indicating that the person is being tracked, and the notification to the person in the consenting region is a second type of notification indicating that information about the person is being shared; and
implement: (i) an extraction function that attempts to extract identity information about the person irrespective of their determined region and consent, and (ii) a sharing function that determines whether or not to share an extracted piece of identity information about the person with a receiving entity in accordance with their determined consent, wherein the piece of identity information about the person extracted when they are determined to be non-consenting is not shared unless and until it is subsequently determined that the person is now consenting.

2. The information extraction system according to claim 1, wherein the processor is configured to determine the person to be consenting when the person performs a predetermined consent gesture when located in the notification region, and non-consenting if the person has not performed the consent gesture in the notification region.

3. The information extraction system according to claim 1, wherein the processor is configured to determine the person to be consenting when the person remains in the notification region for a predefined period of time, and the person is non-consenting prior to expiry of said predefined period of time.

4. The information extraction system according to claim 1, wherein the extraction function comprises at least one of a facial recognition process, a pose tracking process, or an object tracking process.

5. The information extraction system according to claim 1, wherein the receiving entity is a user, and the information is shared with the user via a user interface.

6. The information extraction system according to claim 1, wherein the receiving entity is an external computer system or storage device, and the information is shared therewith with a data interface of the information extraction system.

7. The information extraction system according to claim 1, wherein the notification is rendered to the person as a visual or audio notification, the processor is configured to update the notification in response to changes in behaviour pattern of the person.

8. The information extraction system according to claim 1, wherein a confidence value is calculated for each piece of extracted information, the piece of extracted information only being shared with the receiving entity if the confidence value is greater than a predefined confidence threshold.

9. The information extraction system according to claim 3, wherein the person remains non-consenting after the expiry of the predefined period of time if the person performs a predefined non-consent gesture before expiry of the predefined period of time when located in the notification region.

10. The information extraction system according to claim 5, wherein the user interface, the sensor system and the output device are embodied in a wearable device.

11. A computer implemented method of extracting information about a person, the method comprising:
receiving from a sensor system incoming sensor signals to monitor people within a field of view of the sensor system;
detecting a presence of a person within a notification region of the field of view of the sensor system, the notification region being smaller than the field of view, the notification region comprising a non-consenting region and a consenting region;
causing an output device associated with the sensor system to provide a notification to the person upon entering the notification region;
determining the person to be consenting when the person is located in the consenting region of the notification region, and non-consenting when the person is located in the non-consenting region of the notification region, wherein the notification to the person in the non-consenting region is a first type of notification indicating that the person is being tracked, and the notification to the person in the consenting region is a second type of notification indicating that information about the person is being shared; and
wherein: (i) an extraction function attempts to extract identity information about the person irrespective of their determined region and consent, and (ii) a sharing function determines whether or not to share an extracted piece of identity information about the person with a receiving entity in accordance with their determined consent, wherein the piece of identity information about the person extracted when they are determined to be non-consenting is not shared unless and until it is subsequently determined that the person is now consenting.

12. The computer implemented method according to claim 11, wherein the person is determined to be consenting when the person performs a predetermined consent gesture when located in the notification region, and non-consenting if the person has not performed the consent gesture in the notification region.

13. The computer implemented method according to claim 11, wherein the person is determined to be consenting when the person remains in the notification region for a predefined period of time, and the person is non-consenting prior to expiry of said predefined period of time.

14. The computer implemented method according to claim 11, wherein the extraction function comprises at least one of a facial recognition process, a pose tracking process, or an object tracking process.

15. The computer implemented method according to claim 13, wherein the person remains non-consenting after the expiry of the predefined period of time if the person performs a predefined non-consent gesture before expiry of the predefined period of time when located in the notification region.

16. A computer program, stored on a non-transitory storage medium, for programming a computer system to implement functionality of:
  receiving, from a sensor system, incoming sensor signals to monitor people within a field of view of the sensor system;
  detecting a presence of a person within a notification region of the field of view of the sensor system, the notification region being smaller than the field of view, the notification region comprising a non-consenting region and a consenting region;
  causing an output device associated with the sensor system to render a notification to the person upon detecting the presence of the person within the notification region;
  determining the person to be consenting when the person is located in the consenting region of the notification region, and non-consenting when the person is located in the non-consenting region of the notification region,
  wherein the notification to the person in the non-consenting region is a first type of notification indicating that the person is being tracked, and the notification to the person in the consenting region is a second type of notification indicating that information about the person is being shared; and
  wherein: (i) an extraction function attempts to extract identity information about the person irrespective of their determined region and consent, and (ii) a sharing function determines whether or not to share an extracted piece of identity information about the person with a receiving entity in accordance with their determined consent, wherein the piece of identity information about the person extracted when they are determined to be non-consenting is not shared unless and until it is subsequently determined that the person is now consenting.

17. The computer program according to claim 16, wherein the person is determined to be consenting when the person performs a predetermined consent gesture when located in the notification region, and non-consenting if the person has not performed the consent gesture in the notification region.

18. The computer program according to claim 16, wherein the person is determined to be consenting when the person remains in the notification region for a predefined period of time, and the person is non-consenting prior to expiry of said predefined period of time.

19. The computer program according to claim 18, wherein the person remains non-consenting after the expiry of the predefined period of time if the person performs a predefined non-consent gesture before expiry of the predefined period of time when located in the notification region.

20. The computer program according to claim 16, wherein the extraction function comprises at least one of a facial recognition process, a pose tracking process, or an object tracking process.

\* \* \* \* \*